(No Model.)
A. C. VAUGHAN.
NUT LOCK.
No. 349,674. Patented Sept. 21, 1886.
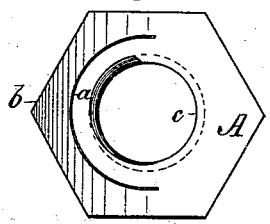
Fig. 1.
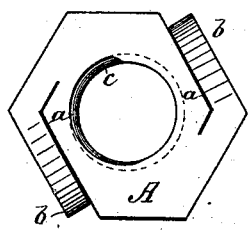
Fig. 2.
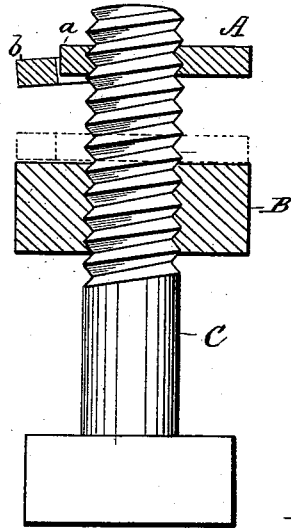
Fig. 4.
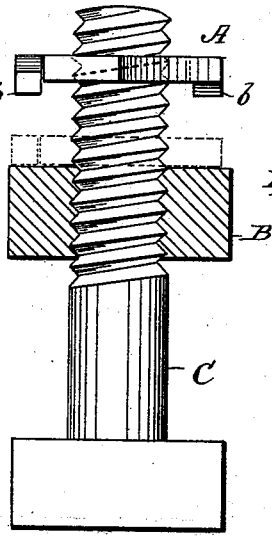
Fig. 5.
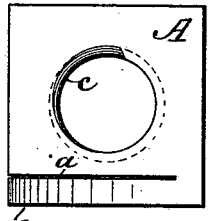
Fig. 3.
Fig. 6.
WITNESSES:
W. W. Hollingsworth
Edw. W. Byrn.
INVENTOR:
A. C. Vaughan
BY Munn & Co.
ATTORNEYS.

UNITED STATES PATENT OFFICE.

AARON C. VAUGHAN, OF SHANE'S CROSSING, OHIO.

NUT-LOCK.

SPECIFICATION forming part of Letters Patent No. 349,674, dated September 21, 1886.

Application filed February 15, 1886. Serial No. 192,012. (No model.)

*To all whom it may concern:*

Be it known that I, AARON C. VAUGHAN, of Shane's Crossing, in the county of Mercer and State of Ohio, have invented a new and useful Improvement in Nut-Locks, of which the following is a specification.

My invention relates to nut-locks of that form which partakes of the function of a jam-nut, and are designed to be applied to the threaded end of the bolt outside of the usual nut, and to bear against the latter, but which jam-nut may in some instances take the place of the nut already in use.

It consists in a nut whose inner periphery is threaded with a regular screw-thread, and whose body portion is cut entirely through with a slit parallel to the axis of the bolt, and a portion of the body portion thus cut is depressed or pushed out of the normal plane of the nut, so as to act as a stout spring, which bears against the other nut when screwed up, and binds thereagainst with a friction which prevents it from turning without the other nut, and the tension of which spring, when the jam-nut is screwed up, causes a strain to exist between the two nuts, that prevents them from turning off together.

In the drawings, Figure 1 represents a plan view of the jam-nut, and Figs. 2 and 3 similar views of modified forms. Fig. 4 is a sectional view of the form shown in Fig. 1 applied to a nut and bolt. Fig. 5 is a view showing the form in Fig. 2 applied to a nut and bolt; and Fig. 6, a view showing the form in Fig. 3 applied to a nut and bolt.

Referring to Figs. 1 and 4, A represents my improved nut-lock or jam-nut. B is the ordinary nut, and C the bolt. The jam-nut A has a regular screw-thread, $c$, on its inner periphery, and at the time of stamping the nut, or after stamping, it has a slit, $c$, cut directly through the full thickness of its body in direction parallel to the axis of the screw-bolt, and the cut portion $b$ is depressed or thrown out of the plane of the other portion of the nut and the nut tempered, so as to cause the deflected section $b$ to have the functions of a stout spring.

Now, after the nut B is put on and screwed up to its bearing, the jam-nut A is applied to the bolt and freely turns on the thread until its spring-section $b$ comes to a bearing against the nut B, and at this time it commences to exert a friction, which increases until the jam-nut A is entirely screwed up, and the section $b$ is sprung back, or nearly so, into the plane of the rest of the jam-nut, as shown in dotted lines in Fig. 4. In this position it will be seen that the spring-section $b$ exerts a powerful strain against the nut B, which creates so much friction that neither of the nuts can turn without turning the other, and they cannot both turn, for the reason that the tension existing between them involves such an unequal strain on the threads of the bolt as to prevent them from acting in unison.

In Figs. 1 and 4 the cut $a$ is semicircular, or nearly so, and terminates at either end in the body of the nut—*i. e.*, it does not extend to the edge of the nut.

In Figs. 2 and 5 the cut commences at the edge and extends a given distance into the body of the nut, so as to form on opposite sides of the nut the spring-sections $b$ $b$, which also in this case have the function of detents or pawls.

In Fig. 3 the cut is upon one side only, and forms one spring-section $b$, which also acts as a pawl.

In all the examples given the nut A is threaded upon the inside with a regular thread, and the body of the nut is cut through entirely from one face to the other by a cut at right angles to the plane of the nut without bisecting or leading into the central hole, and the cut section $b$ is deflected from the normal plane of the nut, so as to form a spring, which both gives a friction and also exerts a jamming strain on the threads.

In most applications the nut A will be used simply as a jam-nut applied to another nut; but as it has a regular screw-thread in it of several convolutions of thread it may be used by itself in many applications where no great strain is involved—such as in connecting stove-castings, &c.

I am aware that washers which have no screw-thread have been formed with slits and deflected sections forming springs; but these could not be used as jam-nuts, and I lay no claim to any such structure.

Having thus described my invention, what I claim as new is—

1. A nut-lock or jam-nut consisting of a body portion having a regular screw-thread upon its inner periphery and a cut or slit extending entirely through the body portion from face to face of the nut without bisecting or penetrating the interior thread, and having the outer cut portion deflected out of the plane of the body portion to form a spring, substantially as shown and described.

2. A nut-lock or jam-nut consisting of a body portion having a regular screw-thread upon its inner periphery and a cut or slit extending entirely through the body of the nut without bisecting the screw-thread, and terminating at both ends in the body of the nut, and having the outer cut section deflected out of the plane of the body portion to form a spring, substantially as and for the purpose described.

The above specification of my invention signed by me in the presence of two subscribing witnesses.

AARON C. VAUGHAN.

Witnesses:
 EDWD. W. BYRN,
 CHAS. A. PETTIT.